United States Patent [19]
Leiber et al.

[11] 3,794,143
[45] *Feb. 26, 1974

[54] ANTI-SKID BRAKE CONTROL APPARATUS FOR SENSING CHANGES IN THE ABSOLUTE ROTATIONAL SPEED OF A VEHICLE WHEEL

[75] Inventors: Heinz Leiber, Leimen; Heinz Wehde, Heidelberg, both of Germany

[73] Assignee: Teldix GmbH, Heidelberg, Germany

[ * ] Notice: The portion of the term of this patent subsequent to Feb. 16, 1988, has been disclaimed.

[22] Filed: Feb. 10, 1971

[21] Appl. No.: 114,213

Related U.S. Application Data

[63] Continuation of Ser. No. 817,340, April 18, 1969, pat. No. 3,563,351.

[30] Foreign Application Priority Data

Apr. 20, 1968 Germany.............................. 1755280

[52] U.S. Cl............................................. 188/181 A
[51] Int. Cl............................................... B60t 8/16
[58] Field of Search 188/181 A; 303/21 BE, 21 CE, 303/21 CG

[56] References Cited
UNITED STATES PATENTS
3,563,351  2/1971  Leiber et al. ................... 188/181 A Primary Examiner—Duane A. Reger
Attorney, Agent, or Firm—Spencer & Kaye

[57] ABSTRACT

An anti-skid brake control system having means for sensing changes in the absolute rotational speed of a vehicle wheel. The sensing means which is eccentrically mounted on the wheel, includes a hermetically sealed housing, an inertial mass arranged within the housing and rotatable relative to the housing within a limited angular range, an electrical signaling device responsive to the relative rotation between the inertial mass and the housing and at least one electrical conductor connected to the signaling device and passing through the housing. The brake control system is also provided with an electrically actuatable device for controlling the brake pressure applied to the sensed wheel and an electrical line interconnecting the sensing means with this control device. According to the invention, the sensor housing and the vehicle wheel or a member rigidly connected with the vehicle wheel are provided with means for detachably coupling these two parts together. Contact elements are also provided, beneath the side of the sensor housing that faces the wheel, to detachably connect the electrical line to the electrical conductor.

7 Claims, 5 Drawing Figures

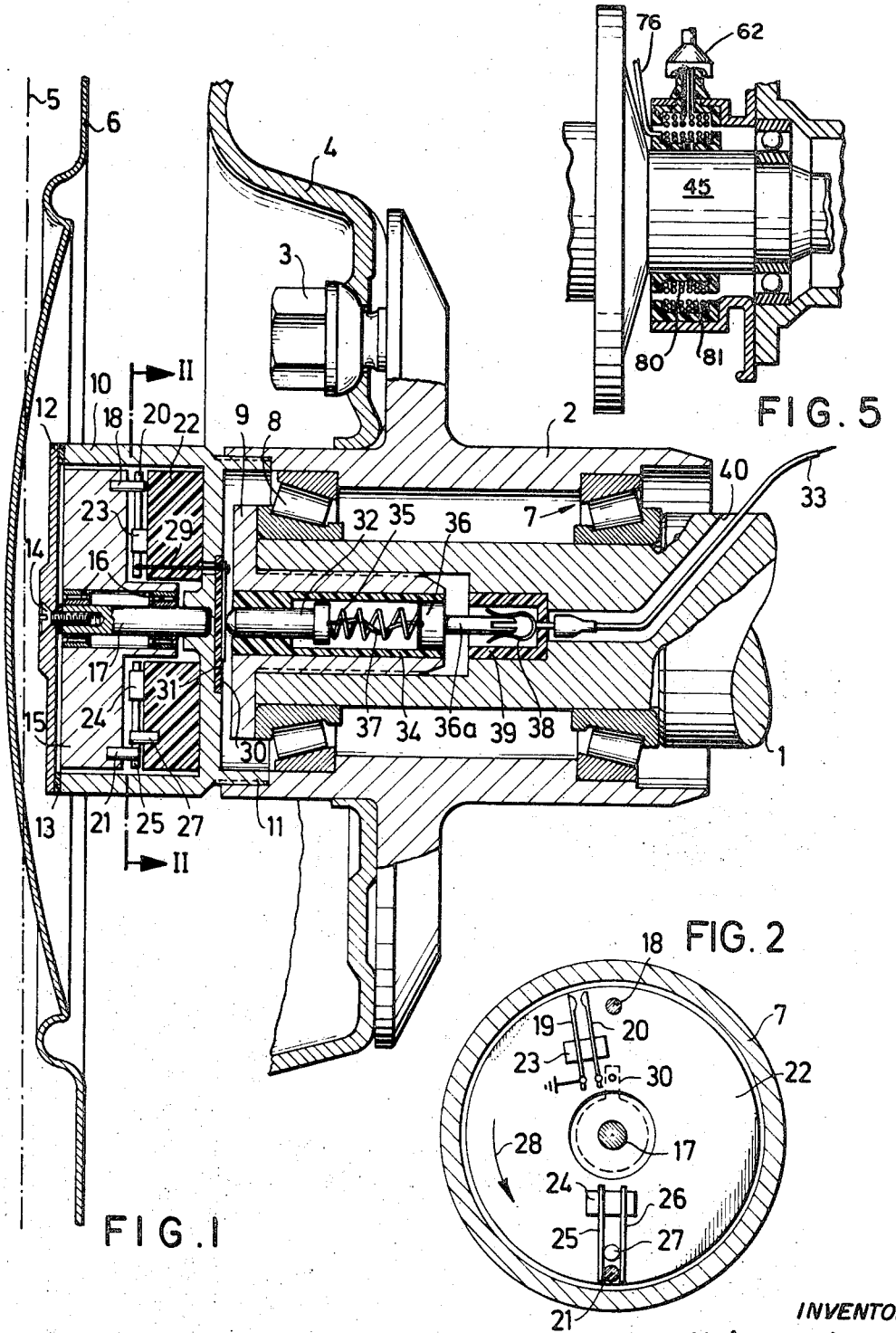

INVENTORS
Heinz Leiber &
Heinz Wehde

BY Spencer & Kaye

ATTORNEYS

ANTI-SKID BRAKE CONTROL APPARATUS FOR SENSING CHANGES IN THE ABSOLUTE ROTATIONAL SPEED OF A VEHICLE WHEEL

CROSS REFERENCE TO RELATED APPLICATION

This is a continuing application of copending application Ser. No. 817,340, filed Apr. 18, 1969, now U.S. Pat. No. 3,563,351.

BACKGROUND OF THE INVENTION

The present invention relates to an anti-skid brake control system suitable for use with wheeled vehicles. The system is of the type having a sensor for monitoring changes in the absolute rotational speed of a vehicle wheel. The sensor comprises a hermetically sealed housing, an inertial mass arranged within the housing and rotatable relative to the housing within a limited angular range, an electrical signaling device — e.g. mechanically actuated electrical contacts — responsive to the relative rotation between the inertial mass and the housing and at least one electrical conductor connected to the signaling device and passing through the housing.

The anti-skid brake control system is also provided with an electrically actuatable device for controlling the brake pressure applied to the sensed wheel. This control device is connected to the electrical conductor or conductors of the sensor described above by means of a suitable electric line. The brake pressure control device is operable, under control of the electrical signaling device of the sensor, to reduce the brake pressure applied to the vehicle wheel if the wheel has a tendency to lock or skid.

The term "absolute rotational speed of the wheel", as used in this application, is intended to refer to the rotational speed of a vehicle wheel relative to the earth. This absolute speed is to be distinguished from the rotational speed of the wheel when viewed, for example, from a point on the vehicle chassis. This distinction is best explained by a consideration of the construction of anti-skid brake control system wheel sensors of the prior art.

Anti-skid brake control system wheel sensors, of the type which measure changes in the rotational speed of a wheel by means of an inertial mass and a signaling device, are conventionally driven via gears, friction wheels or some other suitable drive member which senses the rotations of the vehicle wheel. The drive member is connected to a drive spindle of the sensor which protrudes from the sensor housing; this sensor housing is rigidly fastened to the vehicle chassis.

Since the drive member of the wheel sensor would be caused to turn if the chassis of the vehicle were made to rotate with respect to the wheel, even if the latter were held stationary, it may be seen that the rotational speed of the vehicle wheel is viewed relative to the vehicle chassis. Although this relative speed may, in some cases, be a close approximation of the absolute rotational speed of the vehicle wheel, the differences are large enough to cause an increase in the stopping distance of the vehicle when the sensor is used in a highly sensitive anti-skid brake control system.

To illustrate the effect of measuring changes in the rotational speed of the wheel with respect to the chassis, let it be assumed that the sensor housing is fastened to the brake backing plate and that a driving member disposed on the sensor drive spindle is in engagement with a gear ring fastened to the wheel. Due to the torque applied by the brakes to the wheel suspension system, the brake backing plate will be rotated in the direction of the wheel during the braking process by a not insignificant angle and, upon sudden release of the brake, in the opposite direction. The rotational deceleration of the wheel, as measured by the sensor during the braking process, will thus be less than the actual deceleration and, when the brake is released, the sensor will misleadingly indicate a rotational acceleration which does not occur at the wheel, at least not in the measured intensity.

In certain limited cases in the prior art, it has been possible to construct wheel sensors which measure changes in the absolute value of the rotational speed of a wheel. These sensors are no different in their basic construction from the relative value sensors described above. With these sensors, however, there is a direct (as opposed to gear or other intermediate) connection between the drive spindle of the sensor and the wheel. This direct coupling has only been possible in the cases where a free end of an axle shaft rotating with the wheel is arranged to protrude from a part that is rigidly connected to the vehicle. In this event, the sensor housing can be fastened to the part connected to the vehicle and the end of the axle shaft connected to the drive spindle of the sensor.

An example of such an absolute value sensor may be found in certain prior art wheel sensors employed for railroad vehicles. Since the wheel bearings for track-following axles are normally disposed on the outside of the vehicle, with the wheels on the inside, a free end of each axle shaft protrudes from a bearing sleeve. The drive spindle of the wheel sensor can therefore be directly coupled to this axle end while the sensor housing can be attached to the bearing sleeve or some other nonrotating member of the wheel suspension system.

In the case of driven vehicle wheels which have a bearing located at a point inside of the wheel, non-driven wheels having a hub which rotates about a stationary axle, as well as with dual wheels which are mounted closely together on both sides of a common bearing, it is not possible to provide a direct coupling to wheel sensors of conventional design to permit measurement of changes in the absolute rotational wheel speed. Since most of the present motor vehicles and aircraft are provided with wheel suspension systems and landing gear, respectively, which fall within one of these three categories, it has not normally been possible to sense the absolute rotational speed, or variations thereof, of the vehicle wheels.

The difference between a measurment of the relative rotational speed and the absolute rotational speed of a wheel has, until now, not been appreciated in connection with anti-skid control systems for vehicle brakes. The present invention is therefore based on this new realization that an anti-skid brake control system can only effect the optimum vehicle deceleration when the absolute value of the vehicle wheel speed is monitored. The present invention provides a means for measuring the changes in the absolute speed of a vehicle wheel even with wheel suspension systems which, thus far, have not been adaptable for the use of such a sensor.

The sensors of the prior art which comprise an inertial mass and an electrical signaling device have also always required at least one slip ring or an equivalent arrangement for transmission of the electrical signals between the rotating and the nonrotating parts. Such a signal transmission arrangement has the disadvantage of increasing the size and complicating the structure of the sensor particularly when the signaling device — e.g. the electrical contacts fastened to, and rotating with, the drive spindle — together with the inertial mass, which is rotatable relative to the drive spindle within a limited angular range, are hermetically sealed in a special housing to protect them against corrosion and dirt. This special housing, which also rotates, must consequently be disposed in a second stationary outer housing with the signal transmission device arranged in the space between the two housings.

SUMMARY OF THE INVENTION

An object of the present invention, therefore, is to provide a wheel sensor for an anti-skid brake control system for measuring changes in the absolute rotational speed of a vehicle wheel.

It is an object of the invention to provide an arrangement in which the sensor is eccentrically mounted with respect to the axis of the wheel.

It is a further object of the present invention to provide a wheel sensor, of the above-defined type, which may be installed in vehicles having any conventional type of wheel suspension.

It is still a further object of the present invention to provide a wheel sensor, of the above-defined type, which is smaller in size and less complicated in structure than the wheel sensors of the prior art.

These objects, as well as other objects which will become apparent in the discussion that follows, are achieved, according to the present invention, by providing an eccentrically mounted sensor which consists only of a hermetically sealed housing, an inertial mass arranged within the housing and rotatable relative to the housing within a limited angular range, an electrical signaling device responsive to the relative rotation between the inertial mass and the housing and at least one electrical conductor connected to the signaling device and passing through the housing.

This sensor is constructed so as to be attachable either directly to the vehicle wheel or to a member rigidly connected with the vehicle wheel. Contact elements are also provided, beneath the side of the sensor housing that faces the wheel, to detachably connect the electrical conductor or conductors to the electrical line that leads to the brake pressure control device.

Since this sensor, according to the present invention, requires no connection to a vehicle chassis, it can be installed on any type of wheel that is mounted on motor vehicles or aircraft. It is immaterial, in this case, whether the wheels are driven or not or whether they are mounted on a particular type of bearing or suspension system. The sensor can be mounted at any desired point on the vehicle wheel, as long as the rotational axes of the wheel and of the rotating inertial mass are parallel. This sensor is substantially simpler in construction than the sensors used in the prior art and, due to the encapsulating housing, it is very resistant to the rough conditions of vehicle operation.

Although it is still necessary to provide a signal transmission device, such as slip rings and brushes, to pass the electrical signal or signals from the signaling device within the rotating sensor to the brake pressure control device within the vehicle chassis, such a signal transmission device can now be constructively separated from the sensor housing. As a result, the signal transmission device can be adapted to the particular type of wheel suspension so that it can be best accommodated in the available space and be made as reliable as possible.

The installation and removal of the sensor according to the present invention may be accomplished particularly quickly and simply. The means for connecting the sensor to the vehicle wheel or the member rigidly connected with the vehicle wheel as well as the electric contacts which are provided beneath the floor of the sensor housing for detachably connecting the signaling device within the sensor to the brake control device in the vehicle chassis make it possible to easily attach and detach the sensor.

The requirement that the sensor be mounted on the wheel itself or on a member rigidly attached to the vehicle wheel is not the sole reason why the sensor according to the present invention may be used with all types of wheel suspension systems. It is also important, as required by the present invention, that the electrical connections between the sensor and the brake control device be effected in the mounting plane. This permits the problem of locating and constructing the signal transmission device to be separated from the problem of constructing and mounting the actual sensor. The signal transmission device can then be adapted to the particular type of wheel suspension that is used. This separation has the additional advantage that it permits the use of a single type of sensor for all the wheels of a single vehicle and even for vehicles of different kind and type.

When the contacts are constructed, according to a further developement of the present invention, so that they automatically effect the electrical connection upon installation of the sensor and interrupt the connection when the sensor is removed, the installation and removal of the sensor is additionally simplified.

The sensor may be constructed with an inertial mass mounted eccentrically to its center of gravity and outside of the theoretical wheel axis so that its deflection with respect to an elastic resetting force will be a measure of the rotational speed itself. Such a deflection can then be electrically transmitted to a brake control device which further processes this measured value.

BRIEF DESCRIPTION OF THE DRAWINGS

FIG. 1 is a cross-sectional view of a nondriven wheel and a wheel sensor mounted centrally thereon.

FIG. 2 is a cross-sectional view taken along the line II—II of FIG. 1.

FIG. 5 is a cross-sectional view of modification of the signal transmission device in the embodiment of the present invention shown in FIG. 4.

DESCRIPTION OF THE PREFERRED EMBODIMENTS

Figure 3:
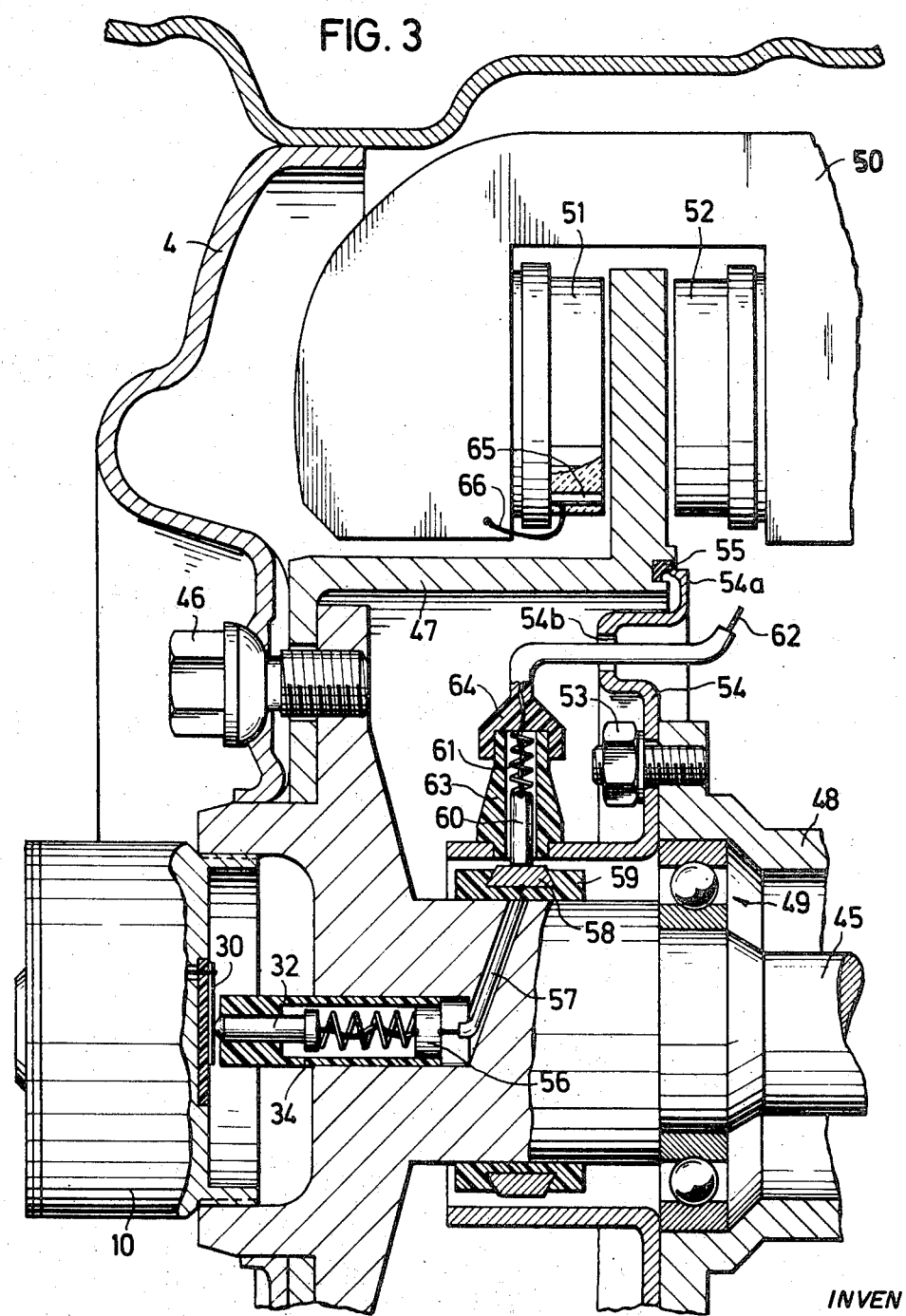
FIG. 3 is a cross-sectional view of an axle-driven wheel and a wheel sensor mounted centrally thereon.

The arrangement of the signal transmission device, which preferably consists of slip rings and brushes, may be of any suitable design to protect it against damage by gravel and dirt it may be preferable to arrange it next to the wheel bearing, within the housing which must be provided to hold the bearing lubricant. Grease will not impair the contact between slip rings and brushes so long as suitable materials are used.

In order to reduce the number of electric lines between the sensor and the brake control device, it is further proposed to utilize the ground connection between wheel and chassis. In the case of ball or roller bearings the two bearing races are electrically connected via the balls or rollers. The ground connection between brake shoes and brake drum or brake disc is parallel to this conductor path; however, the brake lining normally exhibits a high resistance. This resistance may be reduced by embedding an insert, consisting, for example, of brass in the friction linings. The insert should be designed to wear at the same rate as the linings. If this measure is not effective to sufficiently reduce the ground resistance, an additional slip brush may be provided in the bearing. Such a brush is still substantially less expensive than a second slip ring arrangement, which must be insulated with respect to ground.

It is also possible to replace the slip ring brush arrangement with an inductive signal transmission device that may consist, for example, of two coaxial electromagnetically coupled annular coils, one of which is mounted on the wheel, the other on the axle.

FIG. 1 shows a nonrotating wheel axle or a wheel pin 1 supporting a wheel hub 2. An only partially shown wheel rim 4 is fastened by means of bolts 3 to the hub 2 and provided with a hub cap 6. The left most edge of the rim is indicated by a dotted dashed line 5. The wheel hub 2 runs on the tapered roller bearings 7 and 8. The inner race of the bearing 8 is held by the wide head of an adjustment screw 9 which is screwed into a threaded hole in the end of the axle.

A sensor housing 10 is screwed directly into a threaded bore 11 in the wheel hub 2. It is hermetically sealed by a cover 12 which rests on a sealing ring 13 and is secured by a counter-sunk screw 14. In the housing there is contained an inertial mass 15 as well as a signaling device in the form of a contact arrangement 19 and 20. These contacts are best viewed in the cross-sectional illustration of FIG. 2 taken along a line immediately to the right of the inertial mass. The inertial mass is rotatably mounted on two bearings 16 about a bearing pin 17 that is pressed into a hole at the bottom of the housing. An actuating pin 18, disposed in the inertial mass, cooperates with the two flat contact springs 19 and 20 and a further pin 21, also disposed therein, determines the rest position of the inertial mass. Both of these pins appear in section in FIG. 2.

At the bottom of the sensor housing 10 is fastened an annular insulating body 22. Two small, rectangular blocks 23 and 24 are attached to the body 22; the block 23 serves to hold the flat contacting springs 19 and 20 while the block 24 holds two flat springs 25 and 26. The flat springs 25 and 26 enclose, and apply pressure against the pin 21 of the inertial mass as well as a pin 27 that is inserted into the insulating body 22. The inertial mass can thus move from its indicated rest position within a limited angular region by bending the springs 25 or 26 in one direction or the other. With a particularly heavy deceleration of the wheel the inertial mass will move in the direction shown by the arrow 28 (FIG. 2). The pin 18 will then press against the contact spring 20 and bend it toward the left so that it will come in contact with the contact spring 19. This joinder of the springs 19 and 20 closes an electric circuit and signals a reduction in the brake pressure applied to the wheel by a fluid-actuated brake (not shown). As a result, the wheel is allowed to accelerate again and skidding is prevented.

It should be mentioned, in this connection, that the illustrated inner configuration of the sensor is to be considered as only exemplary of the many signaling devices which may be used. Anti-skid brake control systems have been proposed, for example, which employ not only two but a plurality of contact springs so that two or more deceleration-dependent signals will be produced depending on the value of the instantaneous rotational deceleration. Moreover, additional contacts can be provided to the right of the pin 18 to provide a signal indicative of acceleration when the inertial mass rotates in the opposite direction.

Beneath the floor of the sensor housing — i.e. at the side thereof facing the vehicle wheel — are arranged an electrical contact plate 30 and a contact pin 32. These contact elements function to transmit the signal produced at the sensor signaling device within the rotating sensor housing to a nonrotating electrical line which, in turn, is connected to the electrically actuatable brake pressure control device. As may be seen in FIG. 1, the contact spring 20 is connected through the insulating body 22 with the contact plate 30. This plate, which is also shown in broken lines in FIG. 2, is mounted on the outside of the floor of the sensor housing 10 on an insulating disc 31. The plate forms a point contact with the axially movable contact pin 32, and the latter is connected to the insulated electrical line 33 in a manner to be described in detail below. This line is permanently connected to the above-mentiond brake pressure control device which is mounted in a convenient place on the vehicle. The other contact spring 19 is conductively connected with the sensor housing 10, as shown schematically in FIG. 2. The housing 10 is in contact with the hub 2 through the threaded coupling 11 and the hub is in contact with the axle and the metal portions of the vehicle chassis through the rollers of the bearings 7 and 8. The use of a "ground connection", in this manner, eliminates the need for an additional insulated transmission line.

The contact pin 32 is arranged to be axially movable within an insulated bushing 34 and is maintained under pressure by a coil spring 35. The spring is supported at its right-hand end by an insert 36 that is pressed into the insulating bushing. This insert, in turn, has a projection toward the right which forms a plug pin 36a. A cable conductor 37 is soldered to the contact pin 32 and the insert 36 to ensure a positive conductive connection between them. The insulating bushing 34 is firmly pressed into the adjustment screw 9. The plug pin 36a is inserted into a female receptacle 38 which is firmly held in place in the interior of the axle by means of a further insulating insert 39. The stem of the female element is connected to the above-mentioned line 33 which is passed through a longitudinal bore extending first centrally and then obliquely to the outside of the axle.

The anti-skid brake control system sensor can therefore be removed without difficulty; as the sensor housing is unscrewed, the contact pin 32 will move toward the left until its collar abuts against the insulating bushing. Moreover, when the adjustment screw 9 is loosened — e.g. to exchange the bearings — the plug pin 36a will be simply withdrawn from the female element 38. Since the external diameter of the sensor housing is less than the inner diameter of the central opening in the rim of the wheel, it is also possible to dismount the rim without having to remove the sensor.

FIG. 3 shows another arrangement wherein the device is associated with a driven vehicle wheel which is connected to a so-called knockout axle 45.

This driven axle widens toward the left into a flange. The rim 4 as well as a hat-shaped brake disc 47, which is not shown in FIG. 1, are screwed to this flange by means of extended wheel bolts 46. The knockout axle is bearing-mounted in a stationary axle tube housing 48 which supports the vehicle chassis, only the outer bearing, i.e. a ball bearing 49, being shown.

The brake anchor contains two wheel brake cylinders; these wheel cylinders have pistons that press the brake linings 51 and 52 against opposite sides of the outer, annular portion of the brake disc 47.

A profiled ring 54 is mounted on the frontal face of the axle tube 48 by means of screws 53. Its outer edge is constructed in the form of a sealing ledge 54a which slides on a sealing ring 55 of synthetic material inserted into the brake disc., thus forming a sealed annular chamber in the interior of the brake disc. This chamber can, for example, contain the shoes of a drum-type parking or emergency brake (not shown).

The wheel configuration of FIG. 3 can employ the same wheel sensor as is shown in FIG. 1. In this case, however, the housing 10 is screwed to the knockout axle 45. The electrical line leading to the brake pressure control device is connected to the plate 30 with the aid of the contact pin 32 which, unlike the case of FIG. 1, does not rotate with respect to the plate. The contact pin is enclosed by the same insulating bushing 34 as in FIG. 1. This bushing is pressed directly into the knockout axle. Instead of using the insert 36 with the plug pin 36a, a simple insert 56 is provided here and directly soldered to the continuing line 57. The line 57 is insulated and leads outwardly through an oblique bore to a signal transmission device which, in this example, consists of a carbon brush 60 and a slip ring 58. The slip ring surrounds the knockout axle on a ring of insulating material 59. The carbon brush is subjected to a downward pressure by a spring 61 and is connected to a further electrical line 62 that leads to the brake pressure control device.

The carbon brush is located in a housing 63 of insulating material that is mounted on the profiled ring 54. This housing is sealed by a cover 64 of insulating material which extends into the insulating sheath of the line 62. The line 62 leaves the sealed annular chamber through an opening 54b in the profiled ring and then passes along the chassis to the brake pressure control device. The latter device evaluates the signals originating from the sensor and controls pressure applied by the shoes 51 and 52.

The second galvanic conductive path between the wheel sensor and the brake pressure control device is the ground connection between wheel and chassis. This ground connection is established — at least during the braking action - not only through the ball bearings 49 but also through the brake. In order to provide this parallel path via the brake with a minimum passive ohmic resistance, the brake linings 51 and 52 are constructed with a stud-type brass insert 65 that may also be connected, for example, to the body of the brake anchor 50 by means of a flexible electrical cable 66.

Figure 4:
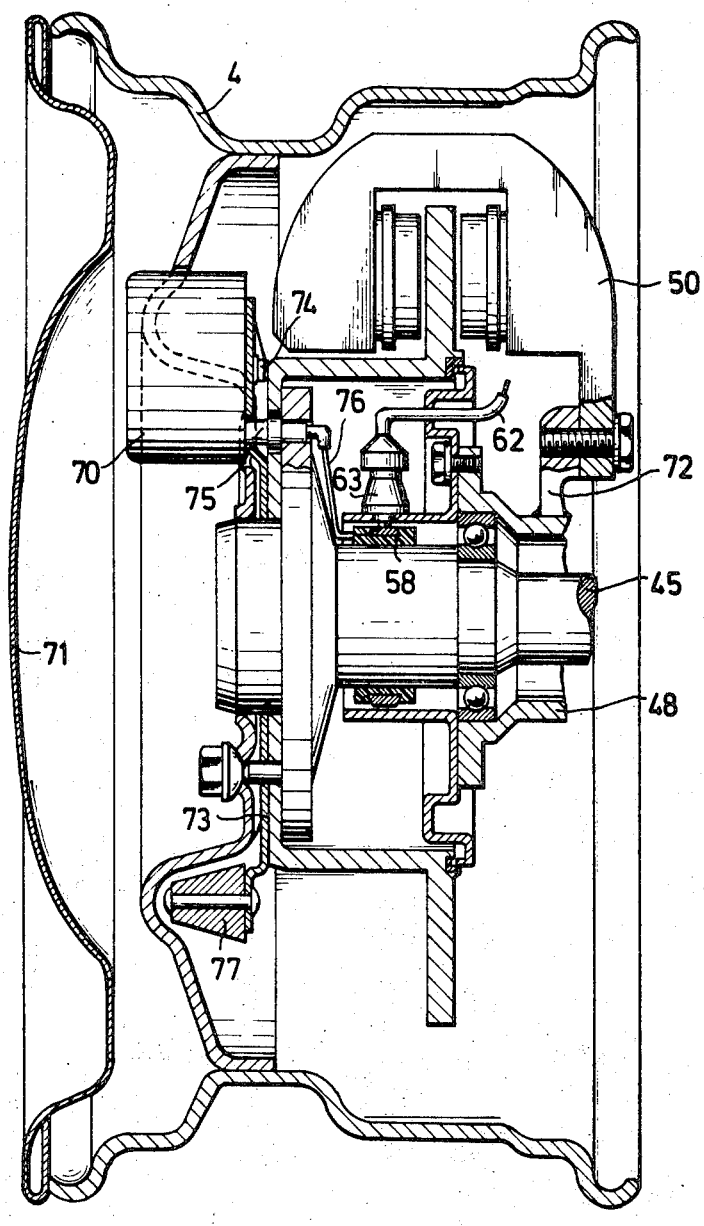
FIG. 4 is a cross-sectional view of an axle-driven wheel and a wheel sensor mounted eccentrically on a counterbalanced sheet metal disc attached to the wheel, in accordance with the present invention.

FIG. 4 shows how sensor 70 may be eccentrically arranged on a driven wheel. The illustration shows the entire wheel rim 4 and a hubcap 71. The axle is again marked 45 and the stationary axle tube housing designated with the reference numeral 48. In addition to the slip ring 58 and the brush housing 63 connected to the line 62, this illustration shows a mount 72, welded to the axle tube housing 48 for holding the brake anchor 50.

Unlike the embodiment shown in FIG. 3, this embodiment of the present invention includes a sheet metal disc 73 disposed under the rim and held by the wheel rim bolts. The floor of the sensor housing 70 is attached to this disc with screws 74. A socket 75 of insulating material which passes through the sheet metal disc 73, the brake disc top and the flange of the axle is screwed together with the flange; this socket contains a conventional plug arrangement that forms the electrical contacts. The male contact element is fastened to the sensor and connected with one of the two contact springs 19 or 20 shown in FIG. 2, whereas the female contact element is fastened in the socket 75 and connected to an insulated line 76. The line 76 extends radially inward at the axle flange and is permanently connected to the slip ring 58.

The slightly modified sensor housing 70 extends through a suitable opening in the wheel rim 4. In order to maintain the balance of the wheel with this eccentric sensor arrangement, counterweight 77, suitably adapted to the shape of the rim, is riveted to the opposite side of the sheet metal disc 73.

FIG. 5 shows an alternative embodiment of the signal transmission device which may be used in the arrangement of FIG. 4. In place of the slip ring and brush, there is shown a first induction coil 80 connected between the line 76 leading to the signaling device of the wheel sensor and ground, and a second induction coil 81 connected between the line 62 that leads to the brake pressure control device and ground. These coils are coaxially arranged about the axle 45 so that the inductance of the circuit formed by the second coil and the line 62 will be influenced by the position of the contacts 19 and 20 of the sensor 70.

When an alternating voltage is applied to the circuit formed by the line 62 and the second coil 81, the inductance of this circuit will be greater when the contacts 19 and 20 are closed, than when they are open. If this inductance is continuously monitored, therefore, it may be used as a "signal" to operate the brake pressure control device.

It will be understood that the above description of the present invention is susceptible to various modifications, changes and adaptations, and the same are intended to be comprehended within the meaning and range of equivalents of the appended claims.

I claim

1. In an anti-skid brake control system for wheeled vehicles having electrically actuatable means for controlling the brake pressure applied to a wheel; means for sensing changes in the absolute rotational speed of such wheel, said sensing means comprising a housing, an inertial mass arranged within said housing and rotatable relative to said housing, electrical signaling means responsive to the relative rotation between said mass and said housing and electrical line means connecting said sensing means with said brake pressure control means, the improvement wherein said housing is attached to the wheel eccentrically with respect to the wheel axis.

2. The improvement defined in claim 1 wherein the axis of said inertial mass is spaced from the axis of the wheel.

3. The improvement defined in claim 1 comprising a counterweight mounted on the wheel on the opposite side thereof from said housing to maintain the proper balance of the wheel.

4. The improvement defined in claim 3 wherein the axis of said inertial mass is spaced from the axis of the wheel.

5. The improvement defined in claim 3 wherein the wheel includes a rim and a disc mounted to said rim, said housing and said counterweight being mounted to said disc.

6. The improvement defined in claim 3 wherein said mass is arranged to rotate relative to said housing only within a limited angular range and at least one insulated electrical conductor is connected to said signaling means, passes through said housing and is connected to said electrical line means.

7. The improvement defined in claim 6 wherein said housing is hermetically sealed.

* * * * *